US008625091B2

(12) United States Patent
Villeneuve et al.

(10) Patent No.: US 8,625,091 B2
(45) Date of Patent: Jan. 7, 2014

(54) SPECTROMETER

(75) Inventors: Alain Villeneuve, Mount-Royal (CA);
Bryan Burgoyne, Montreal (CA);
Daniel Cote, Quebec (CA); Steve Begin,
Quebec (CA)

(73) Assignee: Genia Photonics Inc., Laval (CA)

( * ) Notice: Subject to any disclaimer, the term of this patent is extended or adjusted under 35 U.S.C. 154(b) by 0 days.

(21) Appl. No.: 13/499,341

(22) PCT Filed: Sep. 30, 2010

(86) PCT No.: PCT/CA2010/001563
§ 371 (c)(1),
(2), (4) Date: Aug. 10, 2012

(87) PCT Pub. No.: WO2011/038508
PCT Pub. Date: Apr. 7, 2011

(65) Prior Publication Data
US 2013/0050693 A1    Feb. 28, 2013

Related U.S. Application Data

(60) Provisional application No. 61/272,496, filed on Sep. 30, 2009.

(51) Int. Cl.
*G01J 3/44*        (2006.01)
(52) U.S. Cl.
USPC ........................................................ 356/301
(58) Field of Classification Search
USPC ........... 356/73, 300, 301, 303, 309, 317, 319, 356/323, 326, 475; 250/288
See application file for complete search history.

(56) References Cited

U.S. PATENT DOCUMENTS

| | | | |
|---|---|---|---|
| 4,405,237 A | 9/1983 | Manuccia et al. | |
| 5,258,612 A | 11/1993 | Clark et al. | |
| 5,498,875 A | 3/1996 | Obremski et al. | |
| 6,108,081 A | 8/2000 | Holtom et al. | |
| 6,151,522 A | 11/2000 | Alfano et al. | |
| 6,747,274 B2 * | 6/2004 | Li | ................. 250/288 |
| 7,092,101 B2 | 8/2006 | Brady et al. | |
| 7,280,215 B2 | 10/2007 | Salnik et al. | |
| 7,291,839 B1 | 11/2007 | Demers et al. | |

(Continued)

FOREIGN PATENT DOCUMENTS

WO    WO0038193 A1    6/2000

*Primary Examiner* — Roy M Punnoose
*Assistant Examiner* — Jamil Ahmed

(57) ABSTRACT

A spectrometer (110) including a triggering element (124) for generating a series of trigger signals, a first laser (10) for emitting toward a sample (112) a first laser light pulse (118) having a first wavelength in response to receiving each of the trigger signals, the first laser (10) being wavelength tunable so that the first wavelength is selectively variable; a second laser (114) for emitting toward the sample a second laser light pulse (120) having a second wavelength in response to receiving each of the trigger signals from the series of trigger signals; a dithering element (128) for selectively retarding transmission of the trigger signals to at least one of the first and second lasers such that the first and second laser light pulses (118, 120) are received at the sample substantially non-simultaneously; a delaying element (126) for retarding transmission of the trigger signals to at least one of the first and second lasers in a manner such that the first and second laser light pulses (118, 120) are received at the sample substantially simultaneously when the dithering element (128) is inactive state.

17 Claims, 10 Drawing Sheets

(56) References Cited

U.S. PATENT DOCUMENTS

| | | |
|---|---|---|
| 7,570,349 B2 | 8/2009 | Vachss et al. |
| 7,652,769 B2 | 1/2010 | Zhao et al. |
| 7,787,118 B2 | 8/2010 | Klug et al. |
| 2002/0090650 A1 | 7/2002 | Empedocles et al. |
| 2005/0110990 A1 | 5/2005 | Koo et al. |
| 2008/0161697 A1 | 7/2008 | Chance |
| 2008/0291444 A1 * | 11/2008 | Donaldson et al. ........... 356/317 |
| 2009/0021724 A1 | 1/2009 | Mahadevan-Jansen et al. |

* cited by examiner

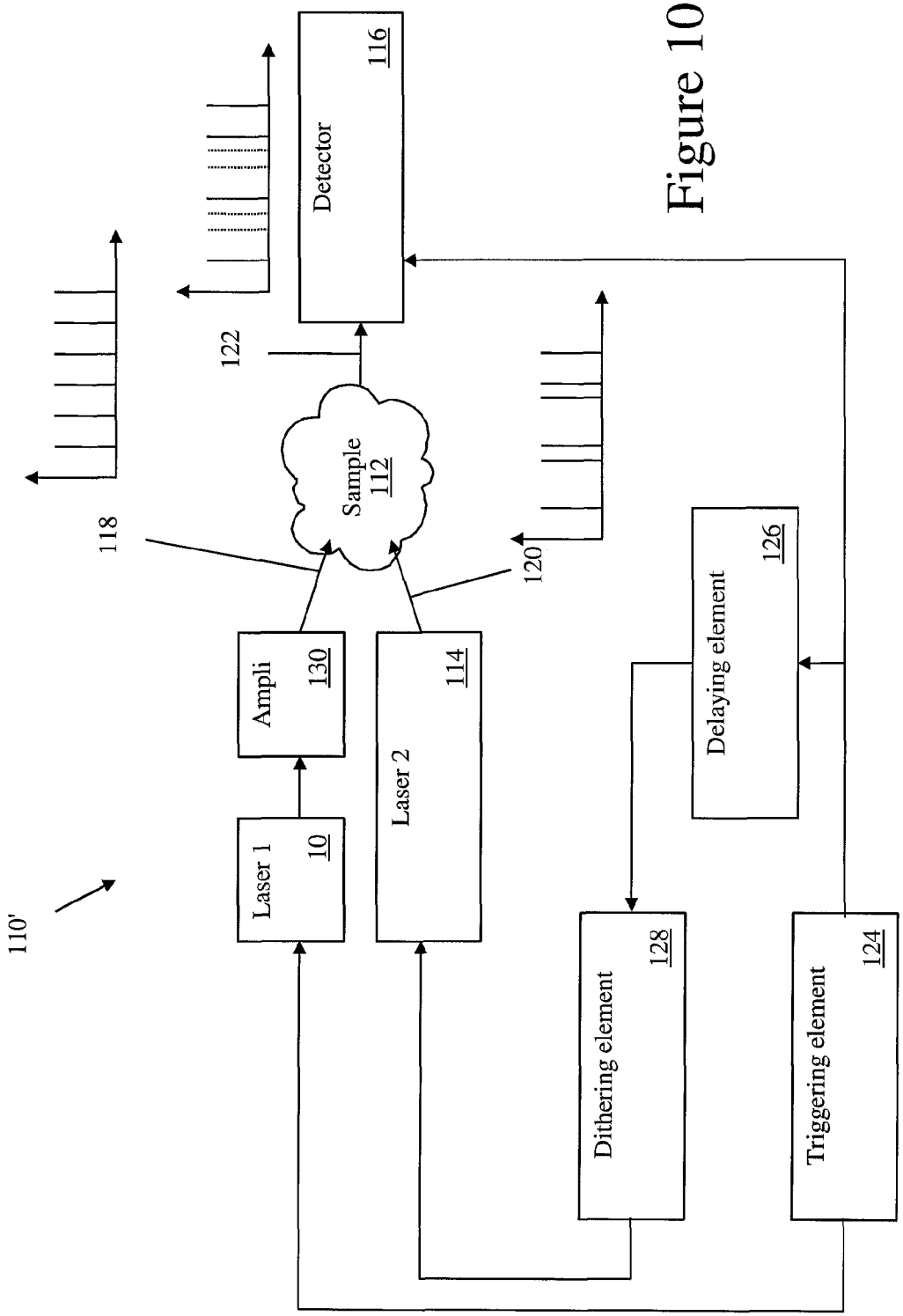

SPECTROMETER

The present application claims priority from U.S. Provisional Patent Application Ser. No. 61/272,496 filed on Sep. 30, 2009, the contents of which is incorporated herein by reference in its entirety.

FIELD OF THE INVENTION

The present invention relates to the general field of substance analysis, and is particularly concerned with a method and device for measuring optical nonlinear interactions in a sample.

BACKGROUND

Many types of spectroscopies require that a sample to characterize be illuminated with light having two different wavelengths simultaneously. Then, the interaction of the sample with this simultaneous illumination is characterized.

Characterization of optical nonlinearities in substances is of great importance for many applications. For example, in Stimulated Raman Scattering (SRS), a substance is illuminated with pulses of laser light having two different wavelengths. Laser light at a first wavelength is pulsed at a first pulse frequency. Laser light at a second wavelength, that interacts with the laser light of first wavelength in the substance to produce the SRS effect, is pulsed at a second pulse frequency, which is typically substantially half the first pulse frequency. The first and second laser lights are synchronized such that at predetermined time intervals, the substance is simultaneously illuminated with the first and second laser lights, and at other time intervals, only one of the first and second laser lights illuminates the substance. This same method is usable to perform Coherent Anti-stokes Raman Scattering (CARS) measurements.

A disadvantage of this method resides in that when the nonlinear effect is present, in other words when the substance is illuminated with first and second laser lights, the optical power received by the substance is different from the power received when only one of the laser lights is present. Therefore, it is relatively difficult to quantitatively assess the nonlinear interactive effects because of these power variations.

Also, the acquisition of a spectrum requires that the wavelength of one of the first and second laser lights be varied in time. This process is typically relatively slow.

Against this background, there exists a need in the industry to provide an improved mode-locked laser. An object of the present invention is therefore to provide such a device.

SUMMARY OF THE INVENTION

In a broad aspect, the invention provides a spectrometer for characterizing a sample, the spectrometer comprising: a triggering element for generating a series of trigger signals; a first laser operatively coupled to the triggering element for receiving the series of trigger signals and emitting toward the sample a first laser light pulse having a first wavelength in response to receiving each of the trigger signals from the series of trigger signals, the first laser light pulses being each emitted after a corresponding predetermined first laser delay after reception of each of the trigger signals, the first laser being wavelength tunable so that the first wavelength is selectively variable, the predetermined first laser delay being dependent on the first wavelength; a second laser operatively coupled to the triggering element for receiving the series of trigger signals and emitting toward the sample a second laser light pulse having a second wavelength in response to receiving each of the trigger signals from the series of trigger signals, the second laser light pulses being each emitted after a corresponding predetermined second laser delay after reception of each of the trigger signals; a dithering element operable between an active state and an inactive state, wherein, in the active state, the dithering element is operatively coupled to the first and second lasers and to the triggering element for selectively retarding transmission of the trigger signals to at least one of the first and second lasers such that the first and second laser light pulses are received at the sample substantially non-simultaneously, and, in the inactive state, the trigger signals are transmitted to the first and second lasers such that the first and second laser light pulses are received at the sample substantially simultaneously; a delaying element operatively coupled to the first and second lasers and to the triggering element for retarding transmission of the trigger signals to at least one of the first and second lasers in a manner such that the first and second laser light pulses are received at the sample substantially simultaneously when the dithering element is in the inactive state; a light detector for detecting light from the sample produced in response to illumination with the first and second laser light pulses; whereby the delaying element compensates for variations in the first laser delay as a function of the first wavelength to maintain substantially simultaneous illumination of the sample with the first and second laser light pulses with the dithering element in the inactive state, and the dithering element selectively delays the first and second laser light pulses with respect to each other to allow alternatively simultaneous and non-simultaneous illumination of the sample with the first and second laser light pulses, the spectrometer allowing for characterization of the sample both with substantially simultaneous and substantially non-simultaneous illumination with the first and second laser light pulses.

Advantageously, decoupling of the "delay" function and of the "dither" function in different elements creates a very flexible spectrometer that is relatively inexpensive to manufacture and relatively easy to use. This decoupling also facilitates precise timing for the reception of the first and second laser light pulses even when the first wavelength is varied rapidly.

For example, in some embodiments of the invention, consecutive trigger signals from the series of trigger signals are separated from each other by a respective inter-signal interval, the first wavelength being a predetermined function of the inter-signal interval. Synchronization of laser light pulse emissions and variations in the first wavelength are thus performed automatically and easily, ensuring good spectrum acquisition.

In some embodiments of the invention, the first laser includes a pump light source for emitting a pump light; an optical resonator having a configuration, optical properties and dimensions such that a round-trip time of the first laser light in the optical resonator depends on the first wavelength; a gain medium inserted in the optical resonator and optically coupled to the pump light source, the gain medium being responsive to the pump light for converting the pump light to the first laser light; an optical intensity modulator inserted in the optical resonator for absorbing a portion of the first laser light as the first laser light propagates back and forth in the optical resonator, the optical intensity modulator having a light absorption coefficient that is modulated as a function of the trigger signals; and an output port for releasing the first laser light from the optical resonator. When the gain medium is pumped with the pump light, modulating the optical intensity modulator produces the first laser light having the first wavelength, with the first wavelength depending on the inter-signal intervals.

In some embodiments of the invention, the first laser, second laser and light detector are configured and positioned for performing Coherent anti-Stokes Raman Scattering (CARS) spectroscopy, Stimulated Raman Spectroscopy (SRS), sum frequency generation spectroscopy or difference frequency generation spectroscopy. However, the reader skilled in the art will readily appreciate that the proposed spectrometer allows for measuring any suitable optical effects in which the first and second laser lights interact in the sample with an interaction term that involves the intensity of the first and second laser lights to any non-zero power.

In another broad aspect, the invention provides a method for characterizing a sample using a first laser and a second laser, the first and second lasers emitting respectively first and second laser light pulses at respectively a first and a second laser light wavelength. The method includes generating a series of trigger signals; transmitting each of the trigger signals to the first laser with a respective first delay; emitting toward the sample one of the first laser light pulses with the first laser when each of the trigger signals is received at the first laser; transmitting each of the trigger signals to the second laser with a respective second delay; and emitting toward the sample one of the second laser light pulses with the second laser when each of the trigger signals is received at the second laser. The first and second delays are selected such that for a subset of the trigger signals from the series of trigger signals, the first and second laser light pulses emitted when the trigger signals from the subset of the trigger signals are received at the first and second lasers arrive at the sample substantially simultaneously, and the first and second laser light pulses emitted when the trigger signals other than the trigger signals from the subset of the trigger signals are received at the first and second lasers arrive at the sample substantially non-simultaneously.

In another broad aspect, the invention provides a method for measuring an optical non-linear interaction in a sample, the method using a first laser light having a first wavelength and a first predetermined power and a second laser light having a second wavelength and a second predetermined power. The method includes: illuminating substantially simultaneously the sample with the first and second laser lights to produce an optical response in the sample to simultaneous illumination with the first and second laser lights; measuring the optical response to simultaneous illumination; illuminating the sample with the first laser light only to produce an optical response in the sample to first laser light illumination; measuring the optical response to first laser light illumination; illuminating the sample with the second laser light only to produce an optical response in the sample to second laser light illumination; measuring the optical response to second laser light illumination; adding the optical response to first and second laser light illuminations to obtain an optical response to non-simultaneous illumination; and comparing the optical responses to simultaneous and non-simultaneous illumination to obtain a measure of non-linear effects in the sample; whereby both optical responses to simultaneous and non-simultaneous illuminations are obtained with substantially similar illumination powers.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

FIG. 10, in a schematic view, illustrates a spectrometer in accordance with an alternative embodiment of the present invention.

DETAILED DESCRIPTION

Figure 1:
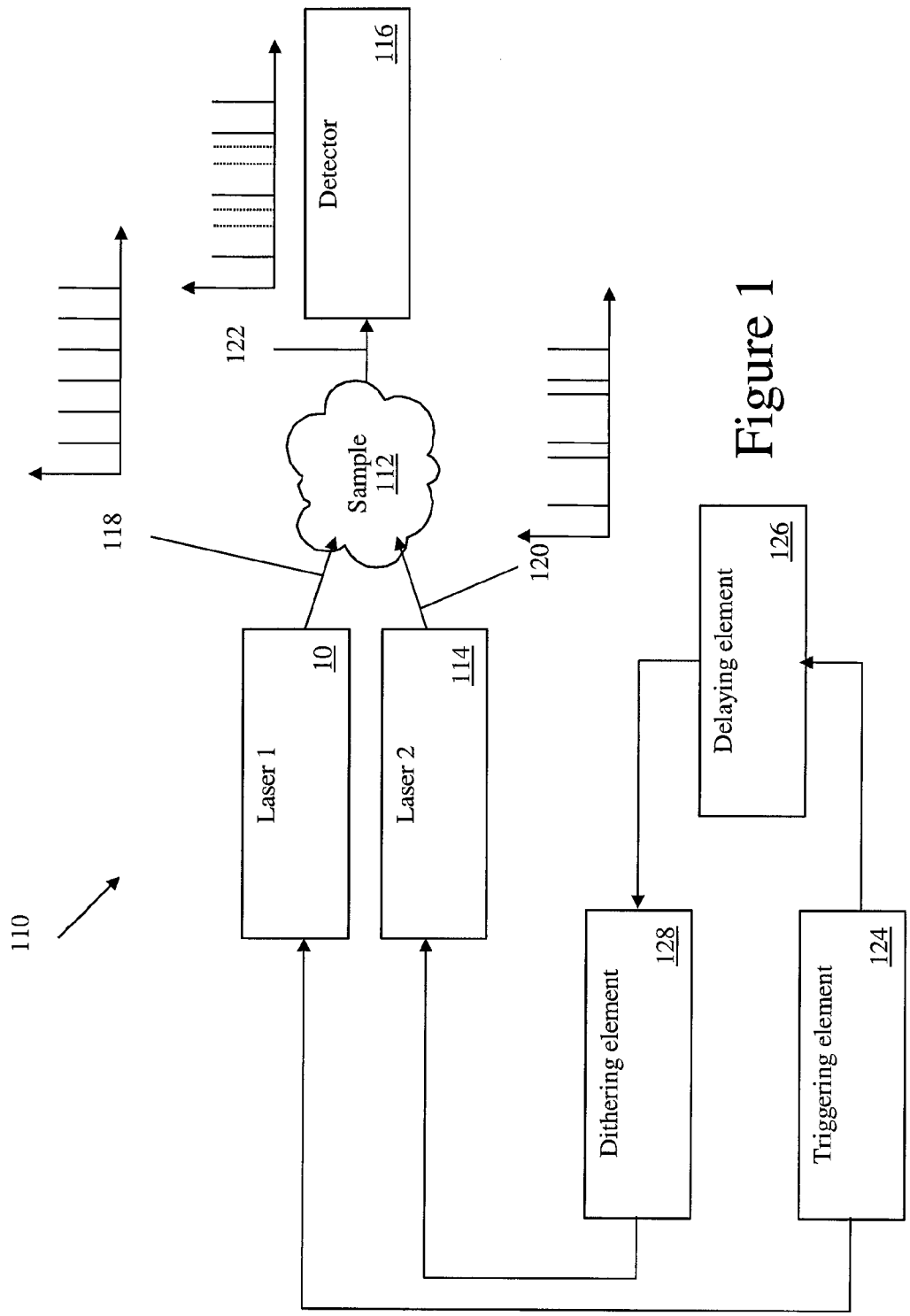
FIG. 1, in a schematic view, illustrates a spectrometer in accordance with an embodiment of the present invention.

FIG. 1 illustrates a spectrometer 110 in accordance with an embodiment of the present invention. The spectrometer 110 is usable for characterizing a sample 112. Typically, the spectrometer 110 measures an optical nonlinear interaction in a sample 112 between light emitted by the spectrometer 110 and the matter contained in the sample 112. For example, a first laser 10, a second laser 114 and a light detector 116 are configured and positioned for performing a spectroscopy selected from the group consisting of Coherent anti-Stokes Raman Scattering (CARS) spectroscopy, Stimulated Raman Spectroscopy (SRS), sum frequency generation spectroscopy and difference frequency generation spectroscopy, among other possibilities.

The physical disposition of the first and second lasers 10 and 114 and of the light detector 116 relatively to each other and relatively to the sample 112 depends on the nature of the sample 112 and on the nature of the interaction between first and second laser light pulses 118 and 120 emitted respectively by the first and second lasers 10 and 114 and this sample 112. Such physical dispositions are well known in the art will therefore not be described in further details. Also, in a typical spectrometer 110, there will be optical components to guide the light emitted by the first and second lasers 10 and 114 and by the sample 112. These optical components, for example lenses, mirrors and optical fibers, among other possibilities, have been omitted from the drawings for clarity reasons. The reader skilled in the art will be able to easily select and position such optical components as needed as a function of the disposition and geometry of the spectrometer 110. Furthermore, while the present description refers to lasers, in alternative embodiments of the invention, light sources other than lasers are usable to perform spectroscopy as described herein.

The spectrometer 110 includes a triggering element 124 for generating a series of trigger signals. The first and second lasers 10 and 114 are operatively coupled to the triggering element 124 for generating light pulses when receiving the trigger signals. A delaying element 126 and a dithering element 128 delay transmission of the trigger signals to the first and second lasers 10 and 114 so that the sample can be alternatively illuminated simultaneously and non-simultaneously with the light coming from the first and second lasers 10 and 114. The spectrometer 110 is described in further details in the following paragraphs.

The triggering element 124 is a component that can generate the trigger signals. The trigger signals are either electrical signals or optical signals, such as, for example, triggering light pulses. The trigger signals may have any suitable shape. In some embodiments of the invention, the trigger signals are square impulsions of predetermined magnitude and duration. Components that can generate suitable trigger signals are well-known in the art and will not be described in further details herein.

The first laser 10 is operatively coupled to the triggering element 124 for receiving the series of trigger signals and emitting toward the sample 112 a first laser light pulse 118 having a first wavelength in response to receiving each of the trigger signals from the series of trigger signals. For example, the first laser 10 and the triggering element 124 are connected to each other by electrically conductive wires that convey the trigger signals in the form of electrical signals.

The first laser light pulses 118 are each emitted after a corresponding predetermined first laser delay after reception of each of the trigger signals. Typically, the first laser 10 is wavelength tunable so that the first wavelength is selectively variable. Typically, because of the inner structure of the first laser 10, the predetermined first laser delay is dependent on the first wavelength.

The second laser 114 is operatively coupled to the triggering element 124 for receiving the series of trigger signals and emitting toward the sample 112 a second laser light pulse 120 having a second wavelength in response to receiving each of the trigger signals from the series of trigger signals. The second laser light pulses 120 are each emitted after a corresponding predetermined second laser delay after reception of each of the trigger signals. For example, the second laser 114 and the triggering element 124 are connected to each other by electrically conductive wires that convey the trigger signals in the form of electrical signals.

In some embodiments of the invention, the second laser 114 is a fixed-wavelength laser, for example a Master-Oscillator Power Amplified (MOPA) laser. However, in other embodiments of the invention, the second laser 114 is any other suitable laser.

The dithering element 128 is operable between an active state and an inactive state. In the active state, the dithering element 128 is operatively coupled to the first and second lasers 10 and 114 and to the triggering element 124 for selectively retarding transmission of the trigger signals to at least one of the first and second lasers 10 and 114 such that the first and second laser light pulses 118 and 120 are received at the sample 112 substantially non-simultaneously. In the inactive state, the trigger signals are transmitted to the first and second lasers such that the first and second laser light pulses 118 and 120 are received at the sample 112 substantially simultaneously.

The delaying element 126 is operatively coupled to the first and second lasers 10 and 114 and to the triggering element 124 for retarding transmission of the trigger signals to at least one of the first and second lasers 10 and 114 in a manner such that the first and second laser light pulses 118 and 120 are received at the sample 112 substantially simultaneously when the dithering element 128 is in the inactive state.

If the trigger signals are electrical impulsions, the dithering and delaying elements 128 and 126 are operative for delaying transmission of the electrical impulsions to the first and second lasers 10 and 114. If the trigger signals are triggering light pulses, the dithering and delaying elements 128 and 126 are operative for delaying transmission of the triggering light pulses to the first and second lasers 10 and 114. Suitable electrically conductive wires or optical fibers, among other possibilities, connect the dithering and delaying elements 128 and 126 to the other components of the spectrometer 110.

The dithering and delaying elements 128 and 126 can be implemented in a single physical component or in disjoint physical components. Typically, the dithering element 128 and the delaying element 126 are both provided in series between the triggering element 124 and the second laser 114 so that one of the dithering element 128 and the delaying element 126 delays the trigger pulses before releasing the trigger pulses to the other one of the dithering element 128 and the delaying element 126, which in turns delays the trigger pulses before releasing them to the second laser 114. The dithering and delaying elements 128 and 126 can be, for example, implemented in a single or in more than one integrated circuit.

A conventional light detector 116 is provided for detecting light from the sample 112 produced in response to illumination with the first and second laser light pulses 118 and 120.

The delaying element 126 compensates for variations in the first laser delay as a function of the first wavelength to maintain substantially simultaneous illumination of the sample 112 with the first and second laser light pulses 118 and 120 with the dithering element 128 in the inactive state. The dithering element 128 selectively delays the first and second laser light pulses 118 and 120 with respect to each other to allow alternatively simultaneous and non-simultaneous illumination of the sample 112 with the first and second laser light pulses 118 and 120. Therefore, the spectrometer allows for characterization of the sample 112 both with substantially simultaneous and substantially non-simultaneous illumination with the first and second laser light pulses 118 and 120, and therefore characterizes non-linear interactions between the first and second laser light pulses 118 and 120 in the sample 112.

Examples of the first laser 10 are described in further details in the following paragraphs. The embodiments of the invention that incorporate the lasers described hereinbelow benefit from a synergy between the structure of the first laser 10 and the overall structure of the spectrometer 110 that create a very efficient, yet relatively low cost, spectrometer. More details about the spectrometer 110 are given hereinbelow, after description of various embodiments of the first laser 10. These details will illustrate how the above-mentioned synergy is created.

Figure 2:
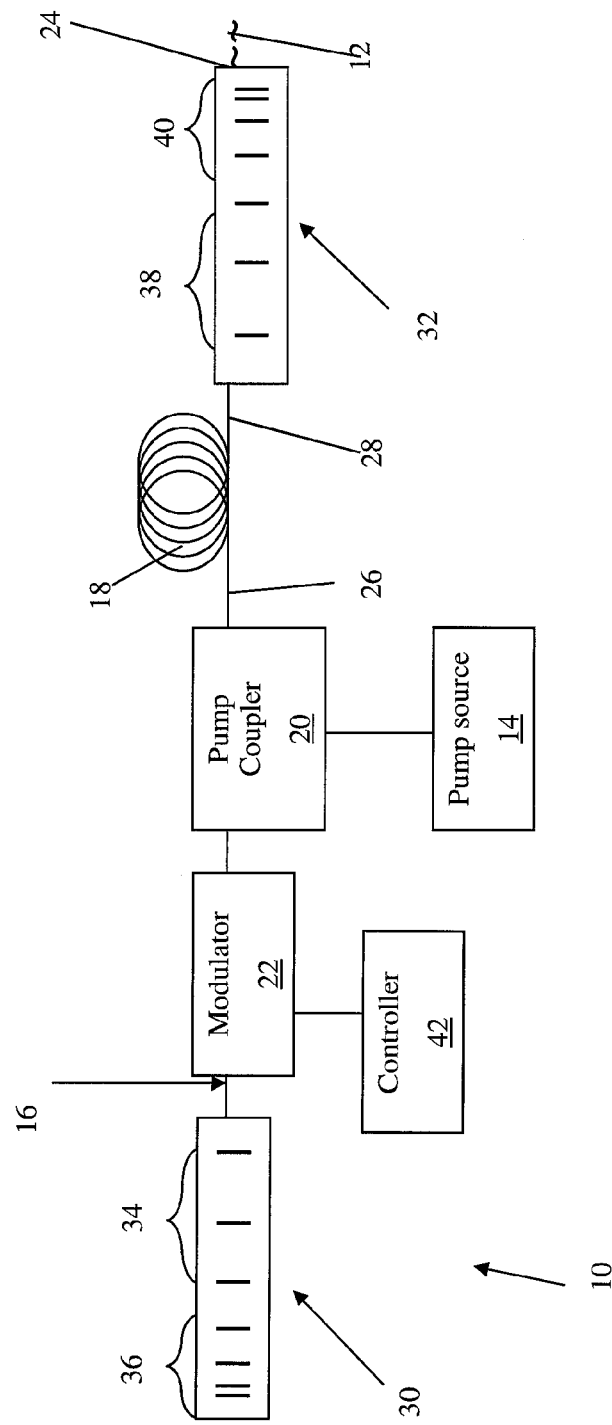
FIG. 2, in a schematic view, illustrates a tunable laser usable in the spectrometer of FIG. 1.

Referring to FIG. 2, there is shown the first laser 10 in the form of a tunable laser 10 for selectively emitting laser light 12 having a first wavelength and a third wavelength. While in some embodiments the tunable laser 10 is able emit laser light 12 having two different, discretely spaced apart, wavelengths, it is also within the scope of the invention to have a tunable laser 10 that is able to emit laser light 12 having more than two different wavelengths and laser light having a wavelength contained within a substantially continuous spectrum of wavelengths included in a predetermined wavelength interval.

The tunable laser 10 includes a pump light source 14 for emitting a pump light (not shown in the drawings). The tunable laser 10 also includes an optical resonator 16. The optical resonator 16 has a configuration, optical properties and dimensions such that a first round trip time of the laser light 12 having the first wavelength in the optical resonator 16 differs from a second round trip time of the laser light 12 having the third wavelength in the optical resonator 16. A gain medium 18 is inserted in the optical resonator 16 and is optically coupled to the pump light source 14. The gain medium 18 defines a gain medium first end 26 and a substantially opposed gain medium second end 28. The reader skilled in the art will understand that the terminology "gain medium first and second ends 26 and 28" does not imply that the gain medium 18 is necessarily rectilinear. For example, the gain medium may be formed by a rolled optical fiber. The gain medium 18 is responsive to the pump light for converting the pump light into the laser light 12. For example, the tunable laser 10 includes a pump light input port 20, also referred to as a pump coupler, optically coupled to the gain medium 18 for receiving the pump light and conveying the pump light to the gain medium 18.

An optical intensity modulator 22 is inserted in the optical resonator 16 for selectively absorbing a portion of the laser light 12 as the laser light 12 propagates back and forth in the optical resonator 16. The optical intensity modulator 22 has a light absorption coefficient that is modulated with a modulation period. The modulation period is selectively adjustable between a first modulation period value and a second modulation period value. The first and second round trip times are substantially equal to a respective integer multiple of respectively the first and second modulation period values.

The reader skilled in the art will readily appreciate the terminology "absorption coefficient" used herein does not imply that light is necessarily physically absorbed in the optical intensity modulator. Instead, this terminology only refers to the portion of the light incoming at the optical intensity modulator that is not transmitted to the remainder of the tunable laser. In some embodiments, the light is simply modulated in intensity through interference.

The tunable laser 10 further also includes an output port 24 for releasing the laser light 12 from the optical resonator 16.

When the gain medium 18 is pumped with the pump light, modulating the optical intensity modulator 22 with the first modulation period value produces laser light having the first wavelength. Also, modulating the optical intensity modulator 22 with the second modulation period value produces laser light having the third wavelength.

Indeed, when the optical intensity modulator 22 is modulated, there will be periodic time intervals during which the optical intensity modulator 22 absorbs more light than at subsequent or previous moments. Since the laser light 12 is preferentially transmitted through the optical intensity modulator 22 at predetermined periodic time intervals, there will be a preference for the tunable laser 10 to operate with laser light pulses circulating within the optical resonator 16 in a manner such that these laser light pulses have a round trip time that is equal to the modulation period with which the optical intensity modulator is modulated, or a multiple of this modulation period. The configuration of the optical resonator 16 will therefore favor laser light pulses within the optical resonator 16 that have a round trip time corresponding respectively to the first and third wavelengths when the optical intensity modulator 22 is respectively modulated with the first and second modulation period values. The pulse duration of the pulses is governed by many factors, among which are the power provided by the pump light source 14, the dispersion in the whole tunable laser 10 and the exact wave shape of the modulation provided by the optical intensity modulator 22.

It has been found particularly advantageous in some embodiments to change the modulation period in steps instead of continuously. Indeed, lasers have a tendency to be locked at a predetermined wavelength when operating. Changing the modulation period in a substantially continuous manner from the first to the second modulation period values may then cause instabilities and, in turn, promote difficult mode locking at the third wavelength. By changing the modulation periods in discreet steps, tuning occurs faster using commonly available components.

In some embodiments, modulating the absorption coefficient of the optical intensity modulator 22 with a signal that is the sum of many single-frequency signals helps in modulating the output laser light 12. For example, by modulating the absorption coefficient with a signal that is the sum of two sinusoidal signals having frequencies that are close to each other, the laser light 12 has an output that varies sinusoidally with a frequency that is equal to the beat frequency of the two sinusoidal signals.

In the embodiment shown in FIG. 2, the optical resonator 16 includes a first reflector 30 and a second reflector 32. The first and second reflectors 30 and 32 are each reflective at about the first and third wavelengths. The first and second reflectors 30 and 32 are optically coupled to the gain medium 18 respectively through the gain medium first and second ends 26 and 28. It should be noted that, in some embodiments, other optical components are present between either of the reflectors 30 and 32 and the gain medium 18. Therefore, the first and second reflectors 30 and 32 need not be directly physically coupled to the gain medium 18.

The first reflector 30 includes a first reflector first portion 34 and a first reflector second portion 36 for reflecting respectively the laser light 12 having the first and third wavelengths. The first reflector first and second portions 34 and 36 are respectively spaced apart from the gain medium first end 26 by a first reflector first portion-to-gain medium distance and a first reflector second portion-to-gain medium distance. The first reflector first portion-to-gain medium distance is smaller than the first reflector second portion-to-gain medium distance. Therefore, the first reflector first portion 34 must be transmitting the third wavelength so that laser light having the third wavelength can reach the first reflector second portion 36.

Similarly, the second reflector 32 includes a second reflector first portion 38 and a second reflector second portion 40 for reflecting respectively the laser light 12 having the first and third wavelengths. The second reflector first and second portions 38 and 40 are respectively spaced apart from the gain medium second end 28 by a second reflector first portion-to-gain medium distance and a second reflector second portion-to-gain medium distance. The second reflector first portion-to-gain medium distance is smaller than the second reflector second portion-to-gain medium distance. Therefore, the second reflector first portion 38 must be transmitting the third wavelength so that laser light having the third wavelength can reach the second reflector second portion 40.

The first and second reflector first portions 34 and 38 are thus distanced from each other by a smaller distance than the first and second reflector second portions 36 and 40. This will cause the laser light 12 having the first wavelength to have a smaller first round trip time between the first and second reflector first portions 34 and 38 than the round trip time of the laser light 12 having the third wavelength between the first and second reflector second portions 36 and 40. In a specific embodiment of the invention, the first and second reflectors 30 and 32 each include a respective fiber Bragg grating. For example, the first reflector first and second portions 34 and 36 include respectively a first and a second fiber Bragg grating segment. In a specific embodiment of the invention, the first reflector first and second portions 34 and 36 each include a respective chirped fiber Bragg grating segment, which may be formed by having a single chirped fiber Bragg grating that defines both the first reflector first and second portions 34 and 36. In some specific embodiment of this latter construction, a tunable laser 10 having continuous wavelength selection is provided.

In some embodiments, the first wavelength is larger than the third wavelength and the chirped fiber Bragg gratings included in the first and second reflectors 30 and 32 also provides dispersion compensation. However, in alternative embodiments of the invention, the first wavelength is smaller than the third wavelength, which may be useful in embodiments in which other components of the proposed tunable laser 10 have anomalous dispersion properties.

In some embodiments, the first reflector 30 includes a relatively highly reflective chirped fiber Bragg grating. In these embodiments, substantially all the light incoming at the first reflector 30 is reflected back towards the gain medium 18. The second reflector 32 is an output chirped fiber Bragg grating and is not perfectly reflective so that some of the laser light 12 can be transmitted through the second reflector 32, which therefore provides the output port 24. Other manners of outputting the laser light 12 from the tunable laser 10 are within the scope of the invention and some of them are described in further details hereinbelow.

In some embodiments, the gain medium 18 has a first gain at the first wavelength and a second gain at the third wavelength. The first and second gains differ from each other. In these embodiments, to facilitate the production of laser light 12 having substantially similar powers at the two wavelengths, the first and second fiber Bragg grating segments included in the first reflector first and second portions 34 and 36 have respectively a first segment reflectivity and a second segment reflectivity. The first and second segment reflectivities are such that the tunable laser 10 has substantially constant gain at the first and third wavelengths. Therefore, it is possible to select the reflectivity of the first reflector first and second portions 34 and 36 so that the reflection of the laser light 12 at these first reflector first and second portions 34 and 36 compensates for the non-flat gain curve of the gain medium 18.

In some embodiments, one or both the first and second reflectors 30 and 32 are each made from a chirped fiber Bragg grating defining a variable group delay therealong. Therefore, the fiber Bragg grating segments included in different portions along the first and second reflectors 30 and 32 have different group delay characteristics, which affects the duration of laser light pulses produced using the tunable laser 10. Also, pulse characteristics other than the duration of the laser light pulses can be modified by selecting suitable group delays for fiber Bragg grating segments included in the first reflector first and second portions 34 and 36.

In yet other embodiments of the invention, the position of the second reflector first and second portions 38 and 40 is reversed with respect to the gain medium 18 while the first reflector first and second portions 34 and 36 remain in the same position. In these embodiments, wavelength selection of the laser light 12 is permitted by spacing apart the second reflector first and second portions 38 and 40 from each other by a greater distance than the distance by which the first reflector first and second portions 34 and 36 are spaced apart from each other. When chirped fiber Bragg gratings are used in the first and second reflectors 30 and 32, different group delay slopes are produced, and the laser operates with a group velocity dispersion that is the difference between the two group delay slopes. A mix between a soliton laser and a normal dispersion laser is thus formed that reduces or eliminates Kelly's side bands.

In some embodiments, the gain medium 18 includes a doped gain fiber. Such doped gain fibers are well known in the art and will therefore not be described in further details. It is also within the scope of the invention to manufacture tunable lasers 10 using any other suitable gain medium 18. Also, the pump light source 14 is any suitable pump light source 14 that can emit pump light that allows the gain medium 18 to produce the laser light 12 having both the first and third wavelengths. For example, the pump light source 14 includes a light emitting diode.

The pump light input port 20 is also any suitable pump light input port 20. For example, the pump light input port 20 includes a wave division multiplexer (WDM) that allows light having the first and third wavelengths to be freely transmitted, or substantially freely transmitted therethrough but which, through optical isolators or any other suitable means, substantially prevents light, and especially the laser light 12, from being transmitted back towards the pump light source 14. The WDM also allows for receiving pump light emitted by the pump light source 14 and transmitting this pump light into the optical resonator 16 and, more specifically, into the gain medium 18.

The optical intensity modulator 22 is any suitable component allowing variations in the transmission of the laser light 12 having the first and third wavelengths therethrough. Typically, the optical intensity modulator 22 takes the form of a component that is optically coupled to and inserted between the chirped fiber Bragg grating forming the first reflector 30 and the WDM multiplexer forming the pump light input port 20. However, any other physical configurations of the optical intensity modulator 22 are within the scope of the invention. In some embodiments, the optical intensity modulator 22 includes an electro-optic modulator.

In some embodiments, the optical intensity modulator 22 is a component that allows the laser light 12 to pass therethrough with two different absorption levels. For example, one level allows substantially all the light incoming at the optical intensity modulator 22 to pass therethrough. At a second level, a predetermined fraction of the light incoming at the optical intensity modulator 22 is not transmitted. In these embodiments, periodically changing the absorption coefficient of the optical intensity modulator 22 between the first level and the second level preferentially selects a laser light pulse that travels through the optical resonator 16 as described hereinabove.

The reader skilled in the art will readily appreciate that the optical intensity modulator 22 need not absorb all or a large fraction of the light circulating within the tunable laser 10 for the mode locking effect provided by the optical intensity modulator 22 to be provided. Indeed, only relatively small variations in the absorption coefficient are sufficient in some embodiments to produce the desired effect.

In some embodiments, the optical intensity modulator 22 includes a variable attenuation modulator. In opposition to the previously described optical intensity modulator, the variable attenuation modulator allows for a substantially continuous variation in the absorption coefficient of the optical intensity modulator 22 over a predetermined absorption range. In this embodiment, the power of the laser light 12 may therefore be regulated using the optical intensity modulator 22, in addition to being regulated using the power of the pump light source 14.

As illustrated in FIG. 2, in some embodiments, the tunable laser 10 includes a controller 42 for controlling the modulation period of the optical intensity modulator 22. Typically, fiber Bragg gratings, such as the fiber Bragg gratings usable in the first and second reflectors 30 and 32, do not have ideal, theoretically predictable, reflection spectra at different locations therealong due to manufacturing defects. However, once a fiber Bragg grating has been characterized, it is possible to map the distance from one end of the fiber Bragg grating to each location therealong and to associate with each of these locations a specific wavelength that is reflected. Therefore, by characterizing the first and second reflectors 30 and 32 in this manner, the controller 42 can be programmed to select precisely the wavelength at which the laser light 12 will be emitted for a specific tunable laser 10 as the modulation period can then be selected to achieve this wavelength.

For example, the controller 42 uses the time interval between successive trigger signals to adjust the wavelength of the first laser light pulses 118. In other examples, the controller 42 is controlled manually or using an external control signal to make changes in the wavelength of the first laser light pulses 118. In yet other examples of implementation, the optical intensity modulator 22 is operatively coupled to the triggering element 124 for receiving the trigger signals, for example through electrically conductive wires or optical fibers. The optical intensity modulator 22 then absorbs less light for a light transmission duration when the trigger signals are received at the optical intensity modulator than between said trigger signals. Typically, in these implementations, the controller 42 is either absent or serves to drive the optical intensity modulator 22 using trigger signals that are not powerful enough to do so, or that are not directly suitable for this purpose because of type (for example electrical vs. optical), intensity, voltage, current or other limitations. In these embodiments, the trigger signals each have a respective trigger signal duration, the light transmission duration being typically substantially equal to the trigger signal duration.

Also, the group delay characteristics of chirped fiber Bragg gratings are not perfect. Imperfections create a group delay ripple which may cause unwanted effects in the pulsed laser light 12. A ratio between the group delay ripple and the group delay as a function of frequency is herein referred to as the ratio spectrum. The pulses of laser light 12 produced by the tunable laser 10 have a pulse spectrum. It is preferable to manufacture the chirped Bragg gratings with sufficient precision that the ratio spectrum is substantially disjoint from the pulse spectrum. In other words, regions of the ratio spectrum in which there is a significant power should be separate from regions of pulse spectrum at which there is a significant power.

Figure 3:
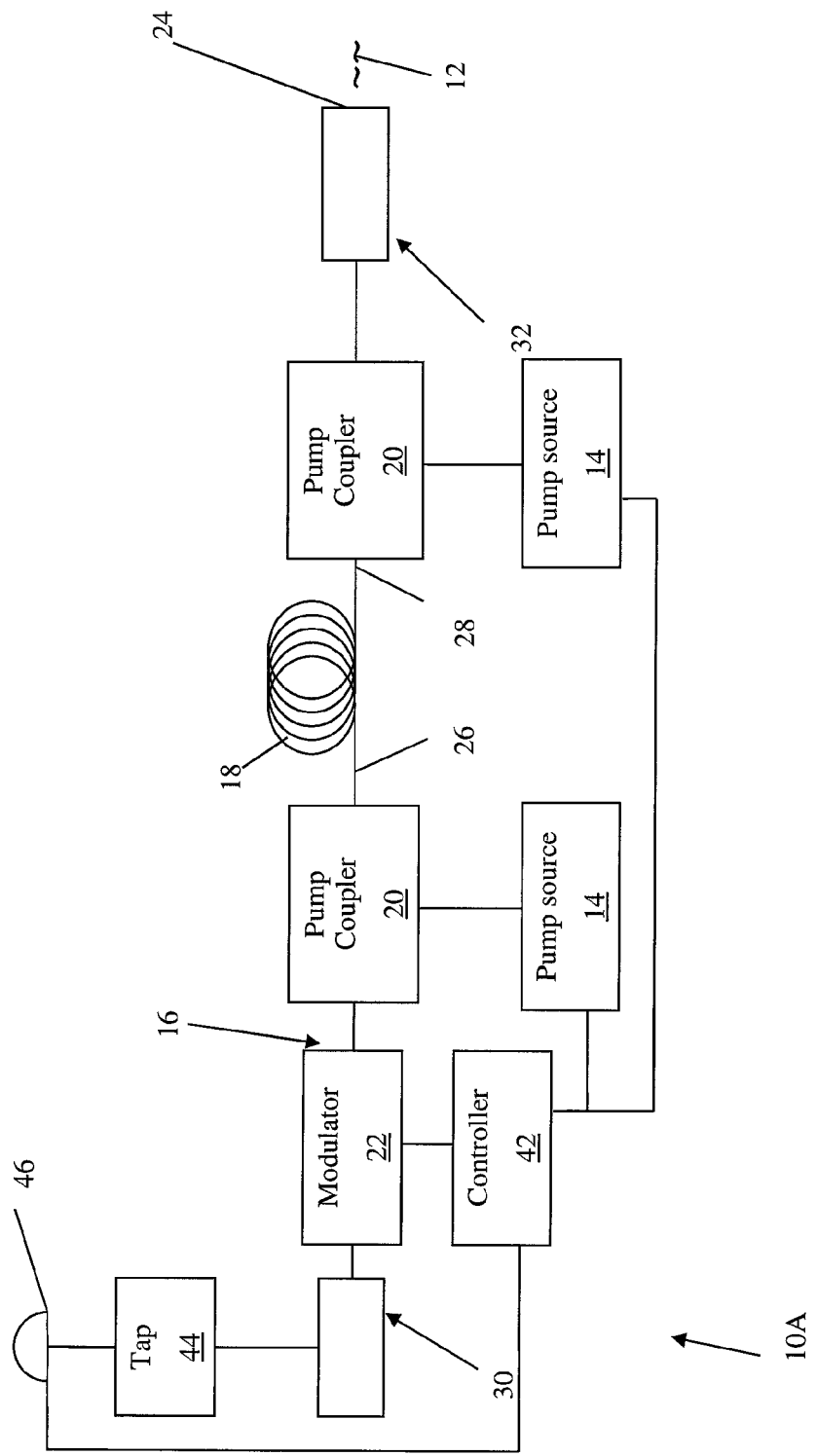
FIG. 3, in a schematic view, illustrates an alternative tunable laser usable in the spectrometer of FIG. 1.

FIG. 3 illustrates an alternative tunable laser 10A usable as the first laser 10 in the spectrometer 110. The tunable laser 10A has many components that are substantially similar to those of the tunable laser 10. These components will therefore not be described in further details.

As seen from FIG. 3, the tunable laser 10A differs from the tunable laser 10 in that it includes two pump light sources 14, each coupled to the gain medium 18 through a respective pump light input port 20. Also, it is within the scope of the invention to have more than two pump light sources 14. In addition, a tap 44 is provided, for example at an end of the first reflector 30 opposed to the gain medium 18, so that a photodiode 46, or any other suitable light intensity measurement device, can be used to measure the taped light and feed this light intensity to the controller 42. The controller 42 is therefore connected to the photodiode 46 so that light intensity measurements can be transmitted by the photodiode 46 to the controller 42. The controller 42 is also operatively coupled to the pump light source 14 for controlling the intensity of the pump light. The controller 42 is then used in a feedback loop to control the power provided by the pump light sources 14 in response to light intensity measurements to obtain a predetermined power for the laser light 12.

Figure 4:
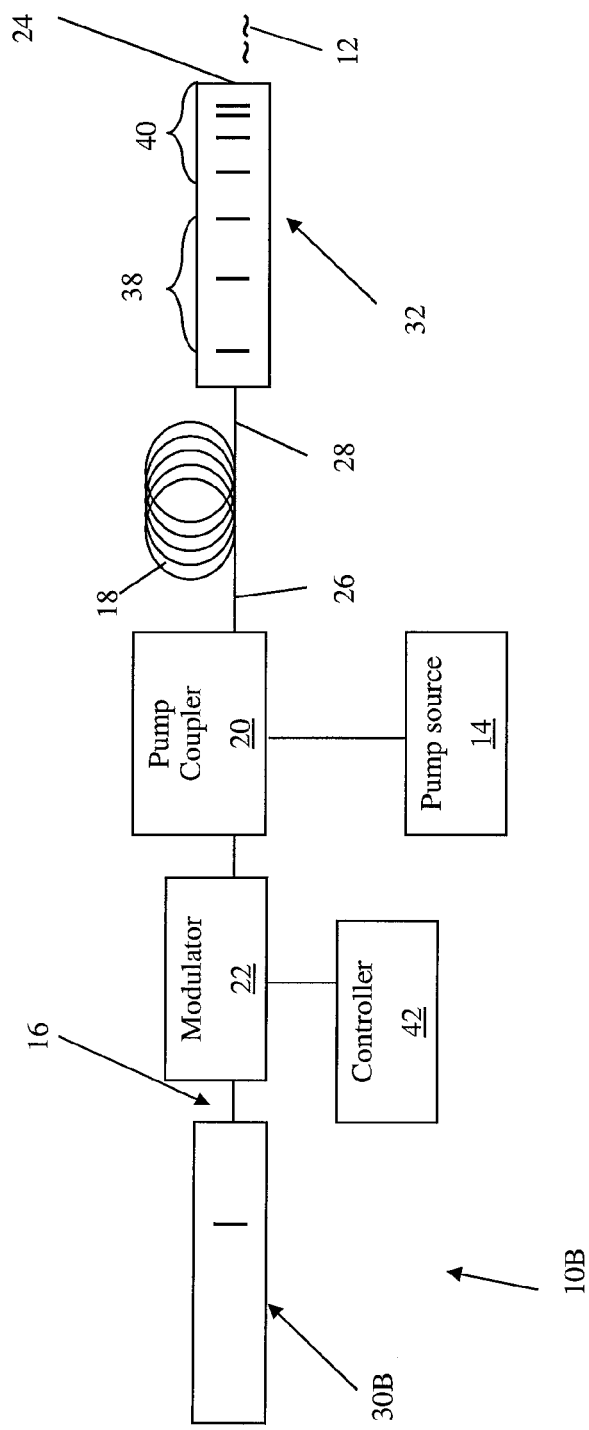
FIG. 4, in a schematic view, illustrates another alternative tunable laser usable in the spectrometer of FIG. 1.

FIG. 4 illustrates yet another tunable laser 10B usable as the first laser 10 in the spectrometer 110. The tunable laser 10B is similar also to the tunable laser 10. A difference that occurs in the tunable laser 10B is that an alternative first reflector 30B is used. The alternative first reflector 30B is such that the first reflector 30B reflects the laser light 12 having both the first and third wavelengths at substantially similar first reflector-to-gain medium distances from the gain medium first end 26. For example, this is achieved by using a mirror instead of a fiber Bragg grating in the first reflector 30B.

Figure 5:
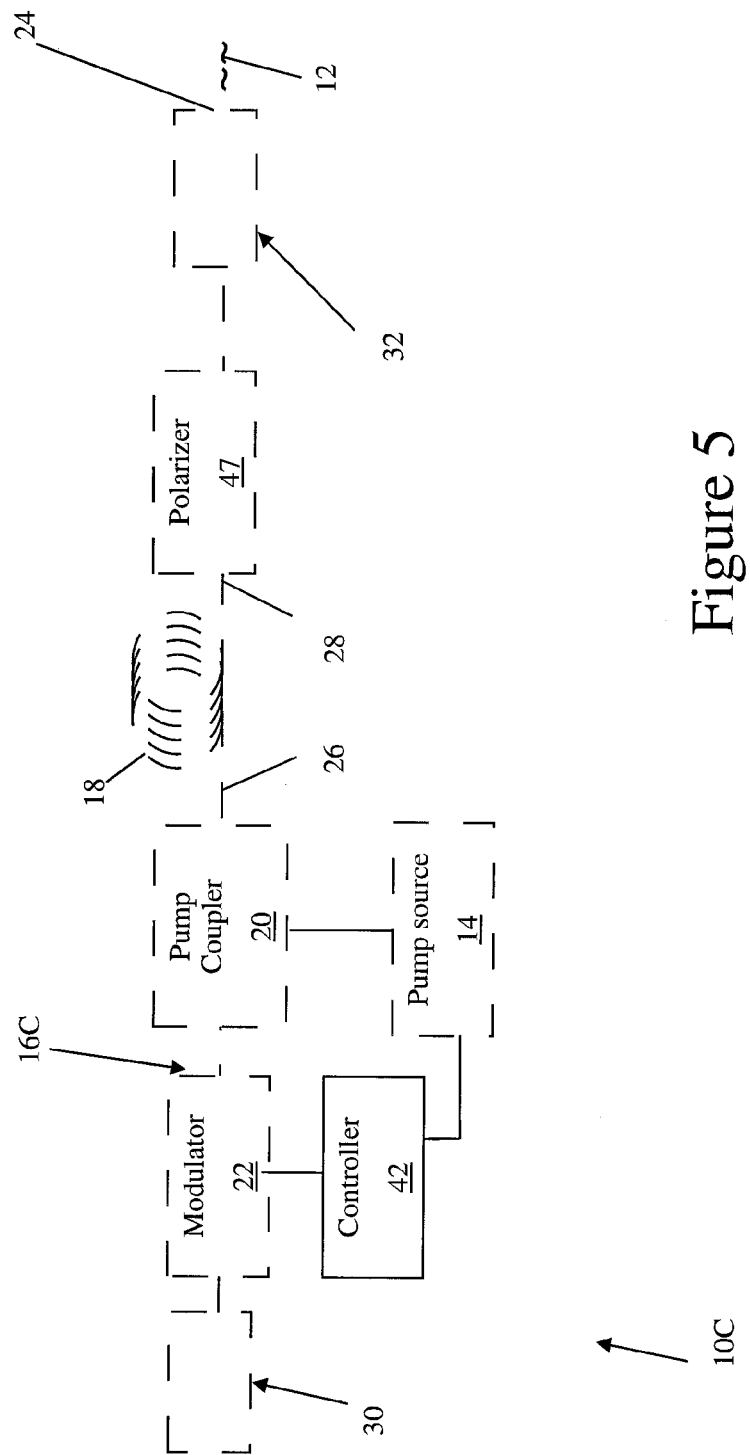
FIG. 5, in a schematic view, illustrates yet another alternative tunable laser usable in the spectrometer of FIG. 1.

FIG. 5 illustrates yet another tunable laser 10C usable as the first laser 10 in the spectrometer 110, in which the optical resonator 16, the gain medium 18 and optical intensity modulator 22 are all polarization maintaining, as illustrated by the dashed representation of these components. Therefore, the tunable laser 10C is able to produce polarized laser light 12. To select the polarization, a polarizer 47 is inserted in the optical resonator 16C for polarizing the laser light 12.

Figure 6:
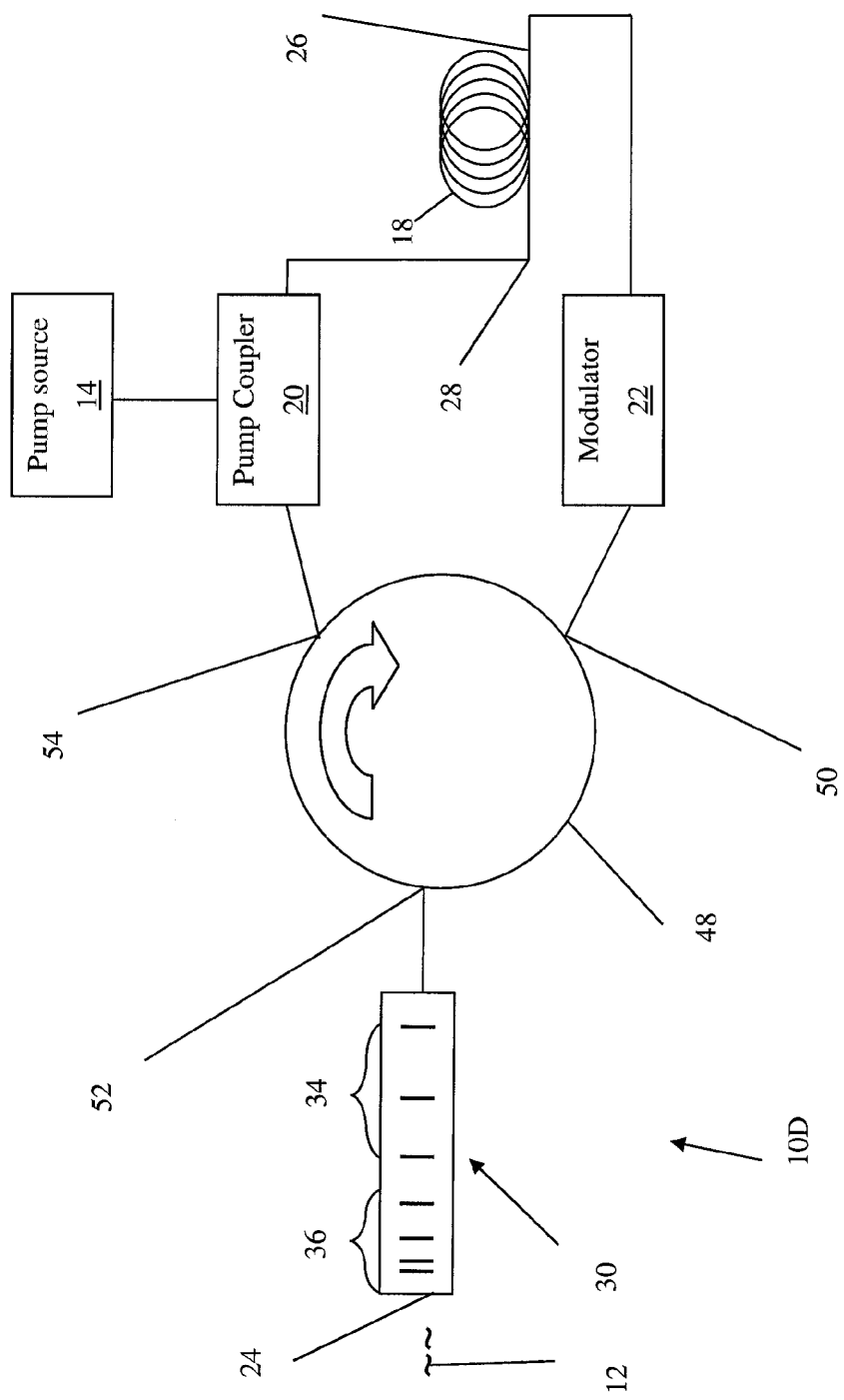
FIG. 6, in a schematic view, illustrates yet another alternative tunable laser usable in the spectrometer of FIG. 1.

FIG. 6 illustrates yet another tunable laser 10D usable as the first laser 10 in the spectrometer 110. The tunable laser 10D uses only a single reflector 30 instead of the first and second reflectors 30 and 32. The resonance in the optical resonator 16D is provided by using an optical circulator 48. The optical circulator 48 includes a circulator first port 50, a circulator second port 52 and a circulator third port 54. The optical circulator 48 is configured in a manner such that the laser light incoming at the circulator first port 50 is emitted at the circulator second port 52, laser light incoming at the circulator second port 52 is emitted at the circulator third port 54 and laser light incoming at the circulator third port 54 is emitted at the circulator first port 50. The circulator first port 50 is optically coupled to the gain medium 18 through the gain medium first end 26 with the optical intensity modulator 22 inserted between the gain medium first end 26 and the circulator first port 50. The circulator second port 52 is optically coupled to the reflector 30 and the circulator third port 54 is optically coupled to the gain medium 18 through the gain medium second end 28 with the pump light input port 20 inserted between the gain medium second end 28 and the circulator third port 54. The reflector 30 is a reflector similar to the first and second reflectors 30 and 32 and has a structure and a function substantially similar to that of the first and second reflectors 30 and 32. In this embodiment, the reflector 30 allows for the emission of the laser light 12 by the laser 10D by letting a portion of the laser light 12 to be transmitted through the reflector 30. In this embodiment of the invention, a unidirectional loop is created, which reduces losses in the tunable laser 10D caused by the optical intensity modulator 22.

Figure 7:
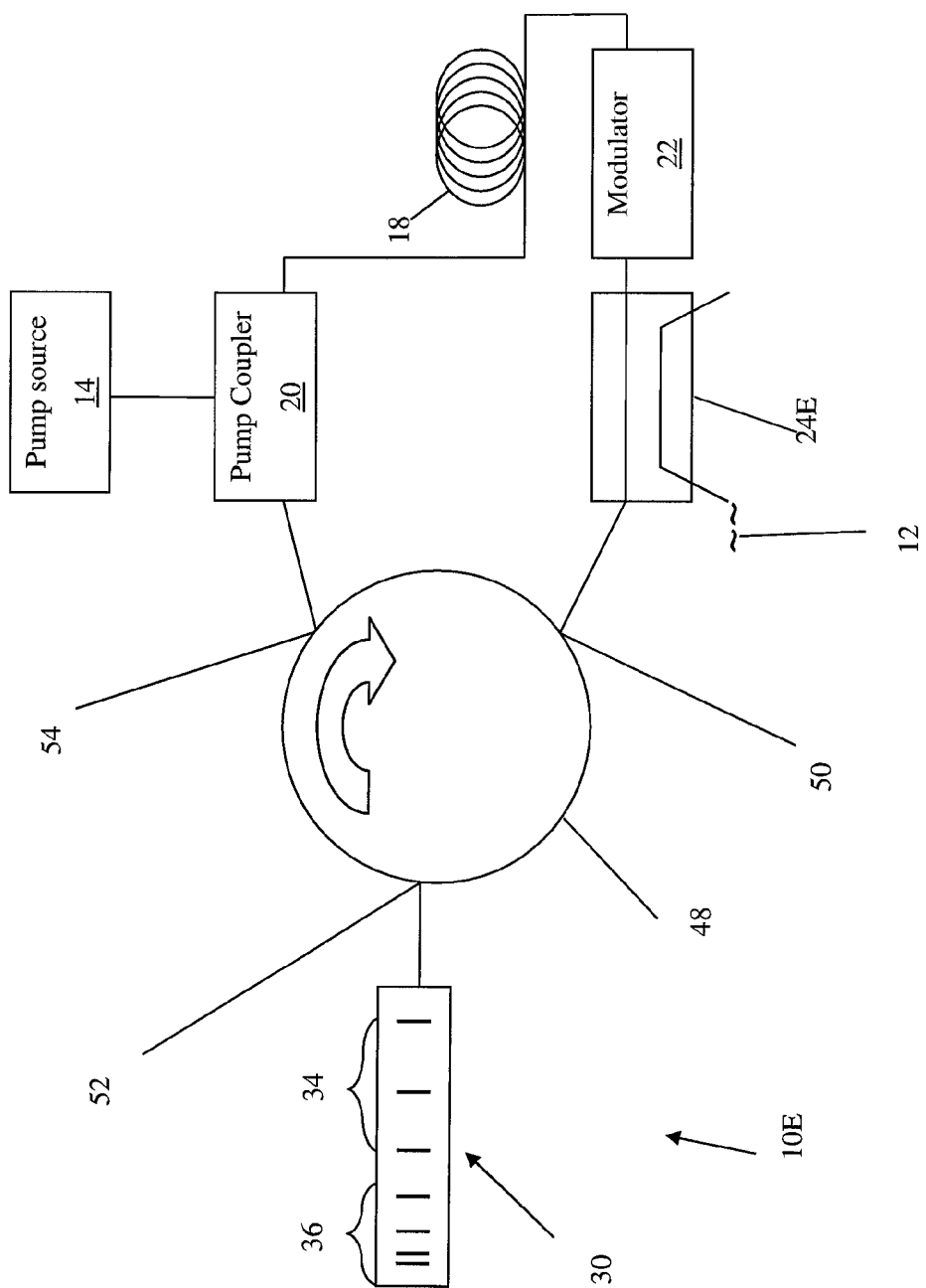
FIG. 7, in a schematic view, illustrates yet another alternative tunable laser usable in the spectrometer of FIG. 1.

In yet another embodiment of the invention, a tunable laser 10E shown in FIG. 7 is provided as the first laser 10 in the spectrometer 110. The tunable laser 10E includes an alternative output port 24E inserted between the optical intensity modulator 22 and the circulator first port 50. The tunable laser 10E has a configuration substantially similar to the configuration of the tunable laser 10D, with the exception that the reflector 30 is highly reflective and, therefore, does not allow for laser light 12 to be transmitted therethrough. Instead, an output port 24E in the form of a fiber coupler or, in other words, a tap, is provided for tapping into the tunable laser 10E and therefore releasing the tunable laser light 12.

Figure 8:
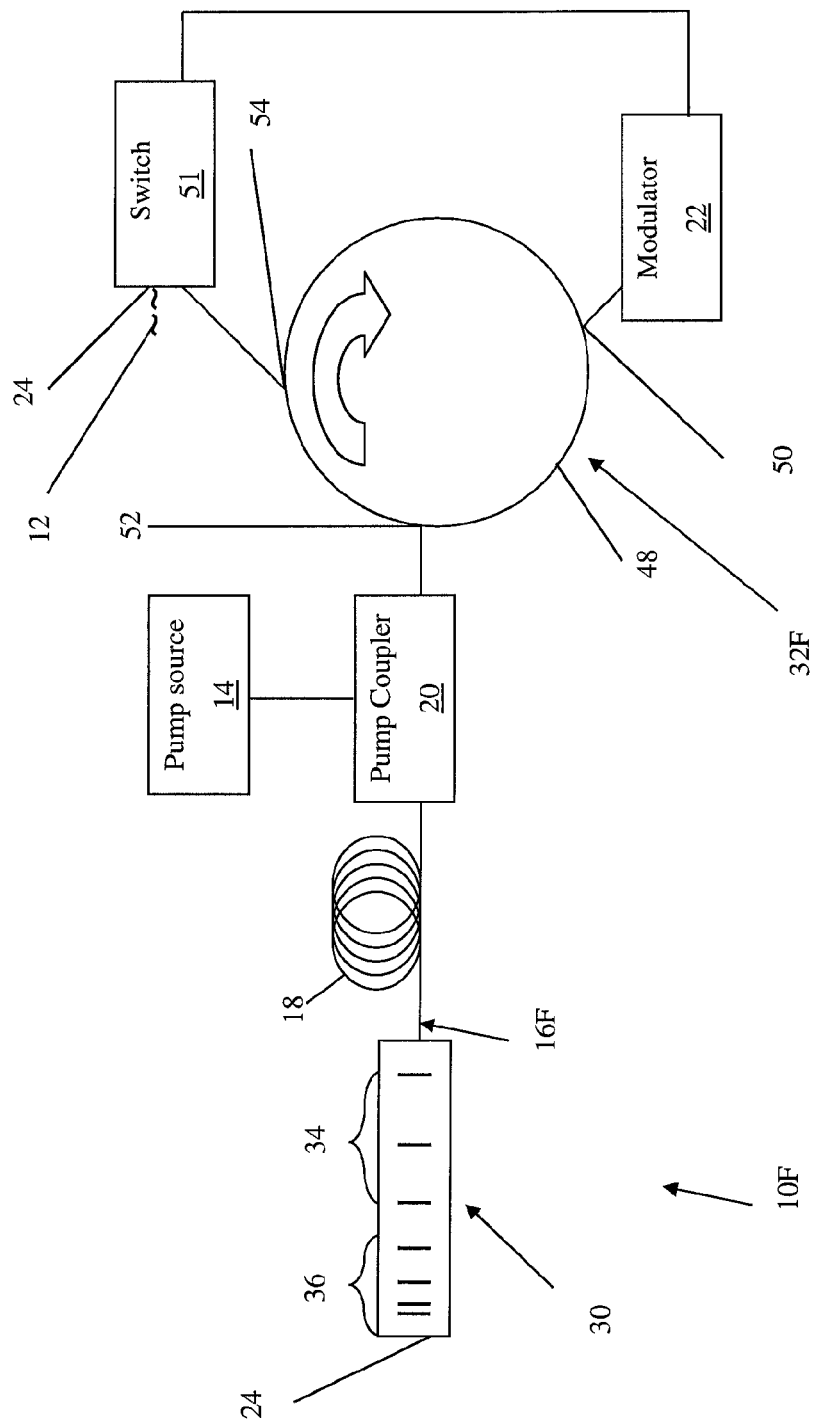
FIG. 8, in a schematic view, illustrates yet another alternative tunable laser usable in the spectrometer of FIG. 1.

FIG. 8 illustrates yet another geometry for a tunable laser 10F, usable as the first laser 10 in the spectrometer 110, in which the second reflector 32F includes an optical circulator 48 for receiving the laser light 12 from the gain medium 18 and returning the laser light 12 back to the gain medium 18. In this embodiment, the circulator first port 50 is optically coupled to the circulator third port 54 with an optical switch 51 and the optical intensity modulator 22 inserted therebetween. The circulator second port 52 is optically coupled to the first reflector 30 with the gain medium 18 and the pump light input port 20 inserted therebetween. Advantageously, various optical components can be inserted in the loop formed between the circulator first and third ports 50 and 54 to allow emission of the laser light 12, modulation of the intensity of the laser light 12 and any other conditioning or characterization of the laser light 12.

The optical switch 51 defines the output port 24F and is usable for selectively releasing the laser light 12 from the optical resonator 16F and confining the laser light 12 in the optical resonator 16F. More specifically, in one state of the optical switch 51, all the light incoming at the switch 51 is fed back into the optical resonator 16F. This allows for build up of laser light power inside the optical resonator 16F. When a pulse is to be let out of the optical resonator 16F, the switch 51 is switched to the other state in which a part or all of the light incoming at the switch 51 is output at another port that forms the output port 24F.

In the above-described tunable lasers 10 to 10F, using suitable components allows for variations in the duration of the laser light pulses by varying the intensity of these laser light pulses. In turn, this intensity is adjustable by varying many controllable variables, such as the duration and time evolution profile of the optical intensity modulation provided by the optical intensity modulator 22 and the power provided by the pump light source 14. In some embodiments, the first reflector 30, the second reflector 32 or both the first and second reflectors 30 and 32 have an adjustable dispersion, which is then also usable to change the laser light pulses shape and duration. It should be noted that the variations in the pulse duration is achievable without changing the pulse repetition frequency.

While some embodiments of a tunable laser have been described hereinabove, it is within the scope of the invention to have many other variants. Also, it is within the scope of the invention to use many concepts associated with lasers to operate the proposed tunable lasers in different operation ranges. For example, the proposed laser may be Q switched and, as described hereinabove in a specific embodiment, cavity dumping may be used.

In some embodiments of the invention, the trigger signals are used to drive the optical intensity modulator 22 so that when the trigger signals are received, the optical intensity modulator 22 let light circulate in the first laser 10 substantially freely, and so that otherwise, the optical intensity modulator 22 is less transparent to light in the first laser 10. In these embodiments, the first wavelength is selected by spacing the trigger signals by different delays.

More specifically, consecutive trigger signals from the series of trigger signals are separated from each other by a respective inter-signal interval. The first wavelength is a predetermined function of the inter-signal interval as the inter-signal interval determines the length of the optical resonator 16 selected, and therefore the value of the first wavelength.

In an example, the inter-signal intervals are substantially identical to each other. In other words, the trigger signals are periodic. This creates a series of first laser light pulses 118 having the same first wavelength. In another example, wherein the inter-signal intervals differ from each other within the series of trigger signals. This creates a series of first laser light pulses 118 having varying first wavelength. In this latter case, it is possible to scan a predetermined wavelength interval with the first laser light pulses.

The delay provided by the delaying element 126 can be selected as a function of the first wavelength in any suitable manner, for example using a look up table, a computer model of the first laser or a curve-fitted function, among other possibilities. The delay can be selected once the behavior of the first laser 10 when the first wavelength is varied is known, either theoretically or experimentally. Once the laser 10 is characterized, computation of measurement of suitable delays is made using methods that are well known in the art.

In some embodiments of the invention, the dithering element 128 is operatively coupled to the triggering element 124 for oscillating between the active and inactive states when each of the trigger signals from the series of trigger signals is released by the triggering element 124. In other words, the first and second laser light pulses 118 and 120 are alternatively simultaneously and non-simultaneously arriving at the sample 112. This variant is illustrated in FIG. 1 in which schematic intensity vs time diagrams are provided substantially adjacent to the reference numerals 118 (for the first laser light pulses 118), 120 (for the second laser light pulses 120) and 122 (for the light detected by the light detector 116). In this latter diagram, the presence of non-linear interaction between the first and second laser light pulses 118 and 120 is indicated by full lines and the absence of such non-linear interaction is indicated by dotted lines.

This embodiment can be achieved, for example, by having a dithering element 128 that switches between the active and inactive states each time a triggering signal is received at the dithering element 128. In other embodiments, the dithering element 128 includes a component that delays the triggering signals only when activated, the activation being controlled by a signal that includes half of the trigger signals. There are many other possibilities for achieving this result.

Typically, the first laser light pulses 118 all have substantially similar powers and duration. Typically, the second laser light pulses 120 also all have substantially similar powers and duration. However, this is not necessarily the case in all embodiments of the invention.

Figure 9:
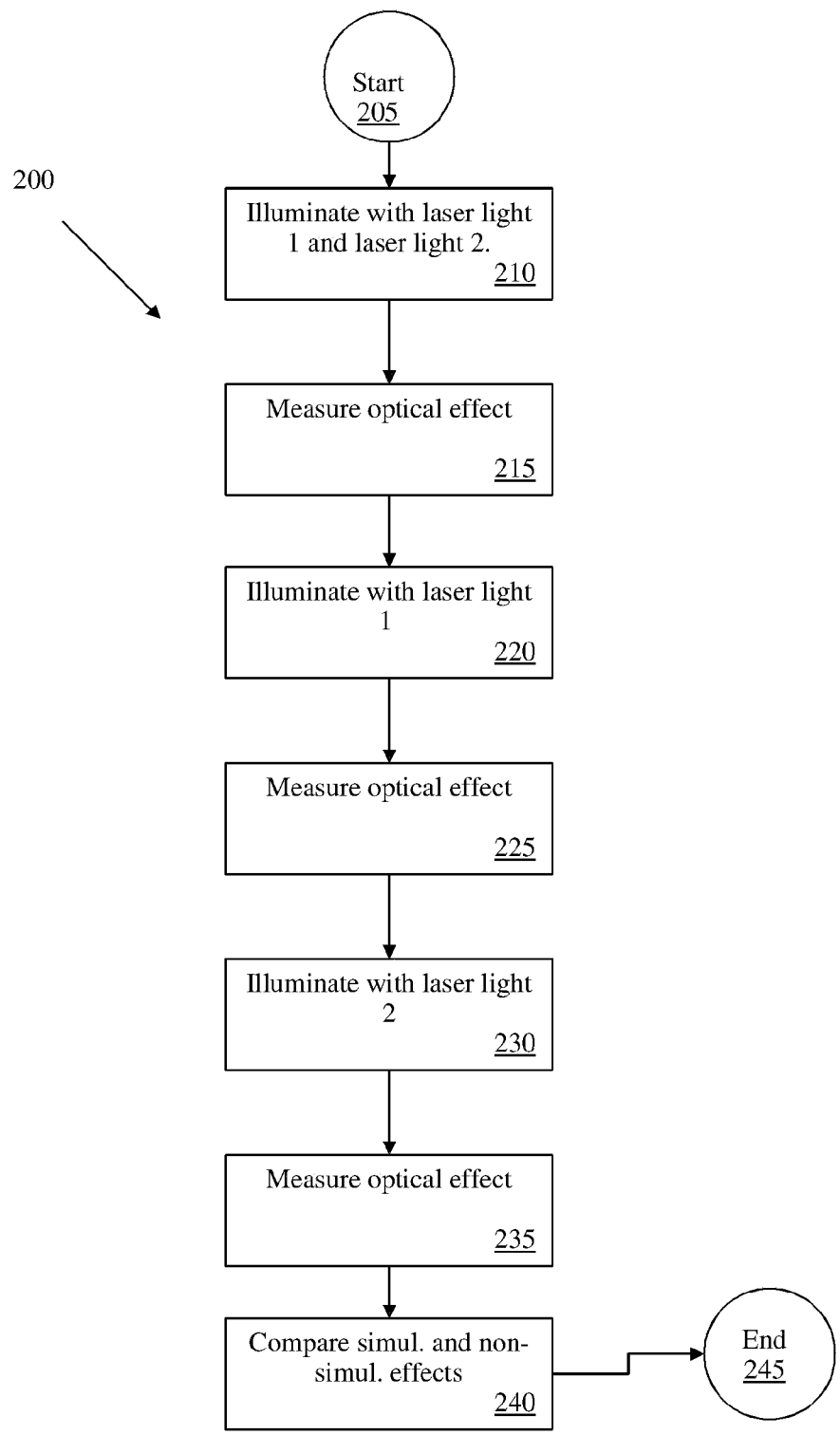
FIG. 9, in a flowchart, illustrates a method performed with the apparatus shown in FIG. 1.

More generally, the spectrometer 110 is usable to perform a method 200 illustrated in FIG. 9. The method starts at step 205. At step 210, one each of the first and second laser light pulses 118 and 120 are used to substantially simultaneously illuminate the sample 112, which produces in the sample 112 an optical response to simultaneous illumination from the first and second laser lights pulses 118 and 120. Then, at step 115, the light detector 116 is used to measure the optical response of the sample 112 to simultaneous illumination with the first and second laser light pulses 118 and 120. Although step 215 is shown in FIG. 10 as being performed after at step 210, it is to be understood that in some embodiments of the invention, these two steps are performed substantially simultaneously, as is the case if the decay time constant of the effect produced in the sample 112 is commensurate in duration with the duration of the first and second laser light pulses 118 and 120. However, in the opposite case, detection using the detector 116 may be performed once the illumination at step 210 has ceased.

Afterwards, at step 220, the sample 112 is illuminated with one of the first laser light pulses 118 only to produce an optical response to the first laser light illumination. The optical response the first laser light illumination is then measured at step 225 using the light detector 116. Subsequently, at step 230, the sample 112 is illuminated with one of the second laser light pulses 120 only to produce an optical response to the second laser light illumination. The optical response to the second laser light illumination is then measured at step 235 using the light detector 116.

Finally, at step 240, the optical response to simultaneous and non simultaneous illumination are compared to gain a measure of nonlinear effects in the sample 112. For example, this is performed by comparing the addition of the optical response to first and second laser light illuminations, which provides the optical response to non-simultaneous illumination, with the optical response to simultaneous illumination. The method then ends at step 245.

The method 200 can be also described as a method for characterizing the sample 112 using the first laser 10 and a second laser 114. Using the specific language relating the description of the spectrometer 110, the method can be summarized as: generating a series of trigger signals; transmitting each of the trigger signals to the first laser 10 with a respective first delay; emitting toward the sample 112 one of the first laser light pulses 118 with the first laser 10 when each of the trigger signals is received at the first laser 10; transmitting each of the trigger signals to the second laser 114 with a respective second delay and emitting toward the sample 112 one of the second laser light pulses 120 with the second laser 114 when each of the trigger signals is received at the second laser 114. The first and second delays are selected such that for a subset of the trigger signals from the series of trigger signals, the first and second laser light pulses emitted when the trigger signals from the subset of the trigger signals are received at the first and second lasers arrive at the sample substantially simultaneously, and the first and second laser light pulses emitted when the trigger signals other than the trigger signals from the subset of the trigger signals are received at the first and second lasers arrive at the sample substantially non-simultaneously.

Referring to FIG. 10, an alternative spectrometer 110' is illustrated. The spectrometer 110' is substantially similar to the spectrometer 110, except that the triggering element 124 also provides the triggering signals to the light detector 116. In these embodiments, the light detector 116 may use the trigger signals to synchronize optical detection with the presence of the first and/or second laser light pulses 118 and 120 in the sample 112. In other words, detection of light is gated by having the light detector 116 operatively coupled to the triggering element 124 for receiving the trigger signals and detecting the light from the sample 112 produced in response to illumination with the first and second laser light pulses (118 and 120) for only predetermined time intervals relative to the reception of the trigger signals by the light detector 116. The predetermined time intervals are such that it is expected that during these time intervals, light will be emitted by the sample 112. Also, although not illustrated in the drawings, in some embodiments of the invention, the output of the dithering element 128 is also, or instead, provided to the light detector 116 for the same purpose.

The spectrometer 110' also includes an optical amplifier 130 inserted between the first laser 10 and the sample 112 for amplifying the first laser light pulses 118. In some embodiments of the spectrometer 110', the optical amplifier 130 is not provided. Conversely, in some embodiments of the invention, the optical amplifier 130 is provided in the spectrometer 110.

Although the present invention has been described hereinabove by way of preferred embodiments thereof, it can be modified, without departing from the spirit and nature of the subject invention as defined in the appended claims.

What is claimed is:

1. A spectrometer for characterizing a sample, said spectrometer comprising:
    a triggering element for generating a series of trigger signals;
    a first laser operatively coupled to said triggering element for receiving said series of trigger signals and emitting toward said sample a first laser light pulse having a first wavelength in response to receiving each of said trigger signals from said series of trigger signals, said first laser light pulses being each emitted after a corresponding predetermined first laser delay after reception of each of said trigger signals, said first laser being wavelength tunable so that said first wavelength is selectively variable, said predetermined first laser delay being dependent on said first wavelength;
    a second laser operatively coupled to said triggering element for receiving said series of trigger signals and emitting toward said sample a second laser light pulse having a second wavelength in response to receiving each of said trigger signals from said series of trigger signals, said second laser light pulses being each emitted after a corresponding predetermined second laser delay after reception of each of said trigger signals;
    a dithering element operable between an active state and an inactive state, wherein, in said active state, said dithering element is operatively coupled to said first and second lasers and to said triggering element for selectively retarding transmission of said trigger signals to at least one of said first and second lasers such that said first and second laser light pulses are received at said sample substantially non-simultaneously, and, in said inactive state, said trigger signals are transmitted to said first and second lasers such that said first and second laser light pulses are received at said sample substantially simultaneously;
    a delaying element operatively coupled to said first and second lasers and to said triggering element for retarding transmission of said trigger signals to at least one of said first and second lasers in a manner such that said first and second laser light pulses are received at said sample substantially simultaneously when said dithering element is in said inactive state;
    a light detector for detecting light from said sample produced in response to illumination with said first and second laser light pulses;
    whereby said delaying element compensates for variations in said first laser delay as a function of said first wavelength to maintain substantially simultaneous illumination of said sample with said first and second laser light pulses with said dithering element in said inactive state, and said dithering element selectively delays said first and second laser light pulses with respect to each other to allow alternatively simultaneous and non-simultaneous illumination of said sample with said first and second laser light pulses, said spectrometer allowing for characterization of said sample both with substantially simultaneous and substantially non-simultaneous illumination with said first and second laser light pulses.

2. A spectrometer as defined in claim 1, wherein consecutive trigger signals from said series of trigger signals are separated from each other by a respective inter-signal interval, said first wavelength being a predetermined function of said inter-signal interval.

3. A spectrometer as defined in claim 2, wherein said inter-signal intervals are substantially identical to each other.

4. A spectrometer as defined in claim 2, wherein said inter-signal intervals differ from each other within said series of trigger signals.

5. A spectrometer as defined in claim 2, wherein said dithering element and said delaying element are both provided in series with each other between said triggering element and said second laser.

6. A spectrometer as defined in claim 2, wherein said first laser includes
- a pump light source for emitting a pump light;
- an optical resonator having a configuration, optical properties and dimensions such that a round-trip time of a first laser light in said optical resonator depends on said first wavelength;
- a gain medium inserted in said optical resonator and optically coupled to said pump light source, said gain medium being responsive to said pump light for converting said pump light to said first laser light; and
- an optical intensity modulator inserted in said optical resonator for absorbing a portion of said first laser light as said first laser light propagates back and forth in said optical resonator, said optical intensity modulator having a light absorption coefficient that is modulated as a function of said trigger signals; and
- an output port for releasing said first laser light from said optical resonator;
- whereby, when said gain medium is pumped with said pump light, modulating said optical intensity modulator produces said first laser light having said first wavelength, with said first wavelength depending on said inter-signal intervals.

7. A spectrometer as defined in claim 6, wherein said optical intensity modulator is operatively coupled to said triggering element for receiving said trigger signals, said optical intensity modulator absorbing less light for a light transmission duration when said trigger signals are received at said optical intensity modulator than between said trigger signals.

8. A spectrometer as defined in claim 7, wherein said trigger signals each have a respective trigger signal duration, said light transmission duration being substantially equal to said trigger signal duration.

9. A spectrometer as defined in claim 1, wherein said dithering element is operatively coupled to said triggering element for oscillating between said active and inactive states when each of said trigger signals from said series of trigger signals is released by said triggering element.

10. A spectrometer as defined in claim 1, wherein said first laser, second laser and light detector are configured and positioned for performing a spectroscopy selected from the group consisting of Coherent anti-Stokes Raman Scattering (CARS) spectroscopy, Stimulated Raman Spectroscopy (SRS), sum frequency generation spectroscopy and difference frequency generation spectroscopy.

11. A spectrometer as defined in claim 1, wherein said second laser is a fixed-wavelength laser.

12. A spectrometer as defined in claim 11, wherein said second laser is a Master-Oscillator Power Amplified (MOPA) laser.

13. A spectrometer as defined in claim 1, wherein said trigger signals are electrical impulsions and said dithering and delaying elements are operative for delaying transmission of said electrical impulsions to said first and second lasers.

14. A spectrometer as defined in claim 1, wherein said trigger signals are triggering light pulses and said dithering and delaying elements are operative for delaying transmission of said triggering light pulses to said first and second lasers.

15. A spectrometer as defined in claim 1, further comprising an optical amplifier provided between said first laser and said sample for amplifying said first laser light.

16. A spectrometer as defined in claim 1, wherein said light detector is operatively coupled to said triggering element for receiving said trigger signals and detecting said light from said sample produced in response to illumination with said first and second laser light pulses for only predetermined time intervals relative to the reception of said trigger signals by said light detector.

17. A method for characterizing a sample using a first laser and a second laser, said first and second lasers emitting respectively first and second laser light pulses at respectively a first and a second laser light wavelength, said method comprising:
- generating a series of trigger signals;
- transmitting each of said trigger signals to said first laser with a respective first delay;
- emitting toward said sample one of said first laser light pulses with said first laser when each of said trigger signals is received at said first laser;
- transmitting each of said trigger signals to said second laser with a respective second delay;
- emitting toward said sample one of said second laser light pulses with said second laser when each of said trigger signals is received at said second laser;
- wherein said first and second delays are selected such that for a subset of said trigger signals from said series of trigger signals, said first and second laser light pulses emitted when said trigger signals from said subset of said trigger signals are received at said first and second lasers arrive at said sample substantially simultaneously, and said first and second laser light pulses emitted when said trigger signals other than said trigger signals from said subset of said trigger signals are received at said first and second lasers arrive at said sample substantially non-simultaneously.

* * * * *